(12) United States Patent
Yoshida et al.

(10) Patent No.: US 7,990,008 B2
(45) Date of Patent: Aug. 2, 2011

(54) ELECTRIC ROTATING MACHINE HAVING DETACHABLE MOVING STATOR DRIVE UNIT

(75) Inventors: Shinichirou Yoshida, Tokyo (JP); Akira Hashimoto, Tokyo (JP); Kouki Naka, Tokyo (JP); Masao Morita, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 263 days.

(21) Appl. No.: 11/683,929

(22) Filed: Mar. 8, 2007

(65) Prior Publication Data

US 2007/0210666 A1    Sep. 13, 2007

(30) Foreign Application Priority Data

Mar. 9, 2006 (JP) ................... 2006-064241

(51) Int. Cl.
*H02K 7/20* (2006.01)
*H02K 16/04* (2006.01)

(52) U.S. Cl. ..... 310/112; 310/199; 310/209; 310/254.1; 310/191

(58) Field of Classification Search .................. 310/190, 310/191, 112, 199, 254, 195, 180, 184, 198, 310/116, 405–406, 67 R
See application file for complete search history.

(56) References Cited

U.S. PATENT DOCUMENTS

| | | | | |
|---|---|---|---|---|
| 3,280,928 A | * | 10/1966 | Stilley | 180/6.5 |
| 3,405,296 A | * | 10/1968 | Stilley et al. | 310/116 |
| 4,338,536 A | * | 7/1982 | Hallidy | 310/191 |
| 4,371,801 A | * | 2/1983 | Richter | 310/156.36 |
| 4,920,293 A | * | 4/1990 | Kanda | 310/116 |
| 5,406,154 A | * | 4/1995 | Kawaguchi et al. | 310/67 R |
| 6,700,242 B2 | * | 3/2004 | Kawamura | 310/68 R |
| 7,382,071 B2 | * | 6/2008 | Morita et al. | 310/112 |
| 2001/0013732 A1 | * | 8/2001 | Hsu | 310/90 |
| 2002/0084705 A1 | | 7/2002 | Kawamura | |
| 2006/0214526 A1 | | 9/2006 | Morita et al. | |

FOREIGN PATENT DOCUMENTS

| | | |
|---|---|---|
| CN | 86 1 06631 A | 4/1988 |
| CN | 87 2 09612 U | 4/1988 |
| CN | 2129014 Y | 3/1993 |

(Continued)

OTHER PUBLICATIONS

Notification of Reasons for Refusal issued in Chinese Patent Application No. 2007100852268 dated May 8, 2009 with English Translation.

(Continued)

*Primary Examiner* — Quyen Leung
*Assistant Examiner* — Eric Johnson
(74) *Attorney, Agent, or Firm* — Buchanan Ingersoll & Rooney PC

(57) ABSTRACT

The electric rotating machine includes a fixed stator fixed to the inner circumferential side of a housing, a moving stator rotatably supported on the inner circumferential side of the housing, a rotor disposed concentrically on the inner circumferential side of the fixed stator and the moving stator, and a moving stator drive formed of a gear and a motor for rotating the moving stator by a predetermined angle. The moving stator drive is detachable with respect to the housing. Coil leader lines are stored in an internal part of the housing so that the moving stator is capable of rotating by a predetermined angle.

13 Claims, 7 Drawing Sheets

FOREIGN PATENT DOCUMENTS

| | | |
|---|---|---|
| CN | 2262636 Y | 9/1997 |
| EP | 1035635 A2 * | 9/2000 |
| JP | 58-12725 B | 3/1983 |
| JP | 08-179100 A | 7/1996 |
| JP | 11-206828 A | 8/1999 |
| JP | 2002199681 | 7/2002 |
| JP | 2003009486 A | 1/2003 |
| JP | 2006271056 A | 10/2006 |

OTHER PUBLICATIONS

Office Action dated Mar. 2, 2010 issued in the corresponding Japanese Patent Application No. 2006-064241 (with English-language translation).

* cited by examiner

ELECTRIC ROTATING MACHINE HAVING DETACHABLE MOVING STATOR DRIVE UNIT

BACKGROUND OF THE INVENTION

1. Field of the Invention

The present invention relates to an electric rotating machine such as variable speed motor or variable speed generator and, more particularly, to a structure of an electric rotating machine capable of relatively changing a circumferentially electrical angle position of a fixed stator and a moving stator.

2. Description of the Related Art

As adjustable-speed electric rotating machine, there has been hitherto proposed an electric rotating machine having a structure being provided with a fixed stator and a moving stator capable of changing a circumferential position relative to a fixed stator (see, for example, the Japanese Patent Publication (unexamined) No. 9486/2003 (31 to 46 lines on page 3, FIG. 5)), or an electric rotating machine having a structure in which a cylindrical member is disposed between a rotor and a stator, and the cylindrical member can be driven to rotate by means of a drive (see, for example, the Japanese Patent Publication (unexamined) No. 199681/2002 (4 to 15 lines on page 6, FIG. 4)). In the above-mentioned structures of the electric rotating machines, it is proposed that magnetic fluxes are controlled, and electric power are saved or range of the number of revolutions is expanded.

SUMMARY OF THE INVENTION

However, in the electric rotating machine of the Japanese Patent Publication (unexamined) No. 9486/2003, although no specific structure is disclosed in detail, the layout of coil leader lines wound around the moving stator is insufficient. That is, depending on the layout of coil leader lines, a problem exists in that the coil leader lines are irregularly moved by the rotation of the moving stator, and the coil lines are sharply folded or an excess tension is applied thereon.

Moreover, in the electric rotating machine of the Japanese Patent Publication (unexamined) No. 199681/2002, upon making greasing of gears or making replacement of parts when troubles occur, being regular maintenance works of the drive, it is necessary that a housing thereof is decomposed to detach bearing or shaft, and the drive is removed. Therefore, this known electric rotating machine is not always easy to construct and its maintainability is low, not to be in reliable construction.

The present invention was made to solve the above-mentioned problems, and has an object of obtaining electric rotating machines of compact device construction, improved maintainability, and high reliability.

An electric rotating machine according to the invention includes: a housing; a fixed stator fixed to the inner circumferential side of the housing; a moving stator supported rotatably on the inner circumferential side of the housing; a rotor disposed concentrically on the inner circumferential side of the fixed stator and the moving stator; and a moving stator drive causing the moving stator to rotate by a predetermined angle; and in which the moving stator drive is detachable with respect to the housing.

In the electric rotating machine of above structure according to the first invention, due to that the moving stator drive is detachable with respect to a housing, since the moving stator drive can be easily assembled and detached, it is easy to make maintenance works such as lubrication or greasing with respect to parts of the moving stator drive or the replacement of parts. Consequently, reliability of an electric rotating machine itself is improved.

Another electric rotating machine according to the invention includes: a housing; a fixed stator fixed to the inner circumferential side of the housing; a moving stator supported rotatably on the inner circumferential side of the housing; a rotor disposed concentrically on the inner circumferential side of the fixed stator and the moving stator; and a moving stator drive causing the moving stator to rotate a predetermined angle; and in which a coil leader line of the moving stator is stored in an internal part of the housing so that the moving stator is capable of rotating by a predetermined angle.

In the electric rotating machine of above structure according to the invention, since the coil leader lines of the moving stator are stored in an internal part of a housing so that the moving stator can rotate a predetermined angle, there is no occurrence of the coil leader lines being sharply folded, or being applied with an excess tension, thus achieving improvement in reliability. Furthermore, since the coil leader lines are stored in the internal part of the housing, dust protection is made or disconnection due to mechanical contact is prevented, thereby enabling to improve reliability.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

Figure 1:
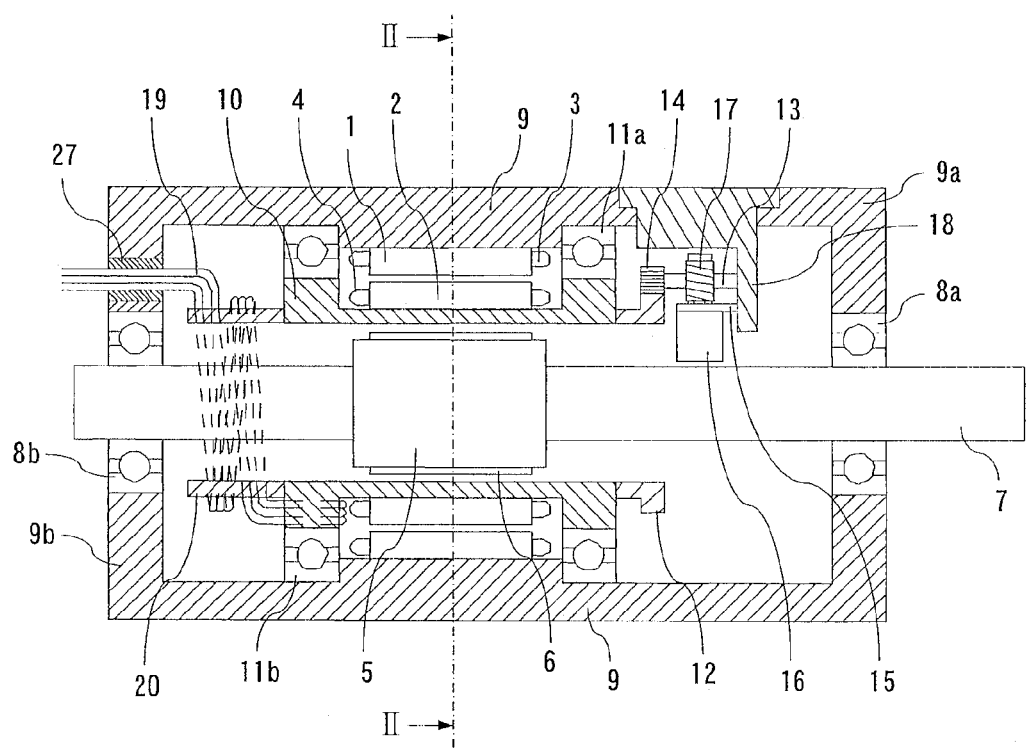
FIG. 1 is a longitudinal sectional view showing an electric rotating machine according to a first preferred embodiment of the present invention.
Figure 2:
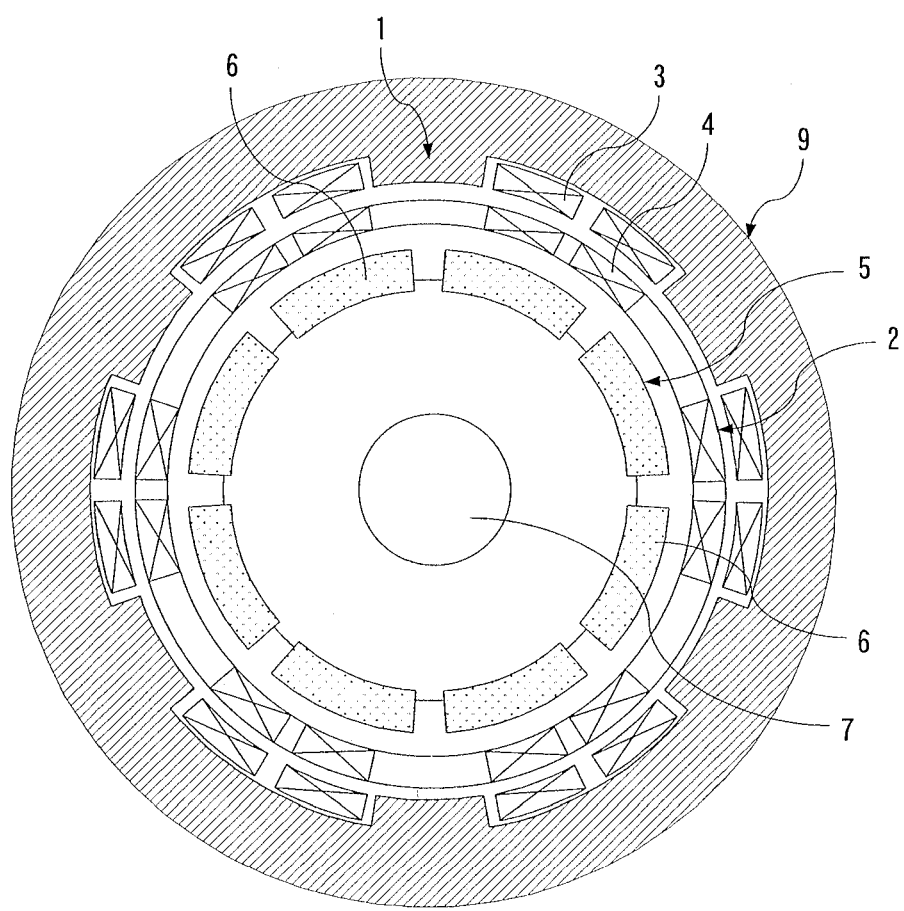
FIG. 2 is sectional view taken along the line II-II of the electric rotating machine of FIG. 1.

FIG. 1 is a longitudinally sectional view showing an electric rotating machine according to a first embodiment of the present invention, and FIG. 2 is a sectional view taken along the line II-II of the electric rotating machine of FIG. 1. As shown in the drawings, the electric rotating machine according to this first embodiment is provided with a fixed stator 1 fixed to the inner circumference of a cylindrical housing 9, a movable moving stator 2 that is concentrically located on the inside of the fixed stator 1 with a predetermined gap, and a rotor 5 located also concentrically on the inside of the moving stator 2 with a predetermined gap.

Plural phases of stator windings 3 are wound around magnetic pole teeth of the fixed stator 1. Further, the moving stator 2 includes plural phases of stator windings 4, and the stator windings 4 are formed into an integral structure, employing non-magnetic and non-conductive materials, for example, molding resins. The stator windings 3 and 4 of the fixed stator 1 and the moving stator 2 are connected in series between the fixed stator 1 and the moving stator 2 in each phase.

Permanent magnets 6 are attached to the rotor 5 at a predetermined pitch circumferentially on the outer circumference thereof, and a shaft 7 for rotary output is attached to the central portion thereof. Furthermore, both ends of the shaft 7 are supported rotatably with bearings 8a and 8b that are attached to bearing supports 9a and 9b of the housing 9.

The moving stator 2 is fixed to the outer circumference of a support cylinder 10 made of non-magnetic and non--conductive materials. This support cylinder 10 is rotatably attached to the housing 9 via bearings 11a and 11b. Therefore, the moving stator 2 is constructed to be capable of relatively rotating with respect to the fixed stator 1. Furthermore, a spur gear 12 having a predetermined mechanical angle range is attached to the support cylinder 10. It is constructed such that this spur gear 12 is engaged with a spur gear 14 attached to a gear shaft 13, and further the gear, which is mounted on the gear shaft 13, is engaged with a worm gear 17 of a drive motor 16. The drive motor 16 is fixed to a motor support plate 15 of a gear box 18.

In the above-mentioned construction, when the drive motor 16 is driven to cause the spur gear 12 to rotate by a predetermined mechanical angle via the worm gear 17, the gear shaft 13 and the spur gear 14, the moving stator 2 is rotated only by a predetermined angle along with the support cylinder 10. Thus, circumferentially electrical phases of the fixed stator 1 and the moving stator 2 are relatively changed, thereby enabling to make a combined voltage thereof variable.

Figure 3:
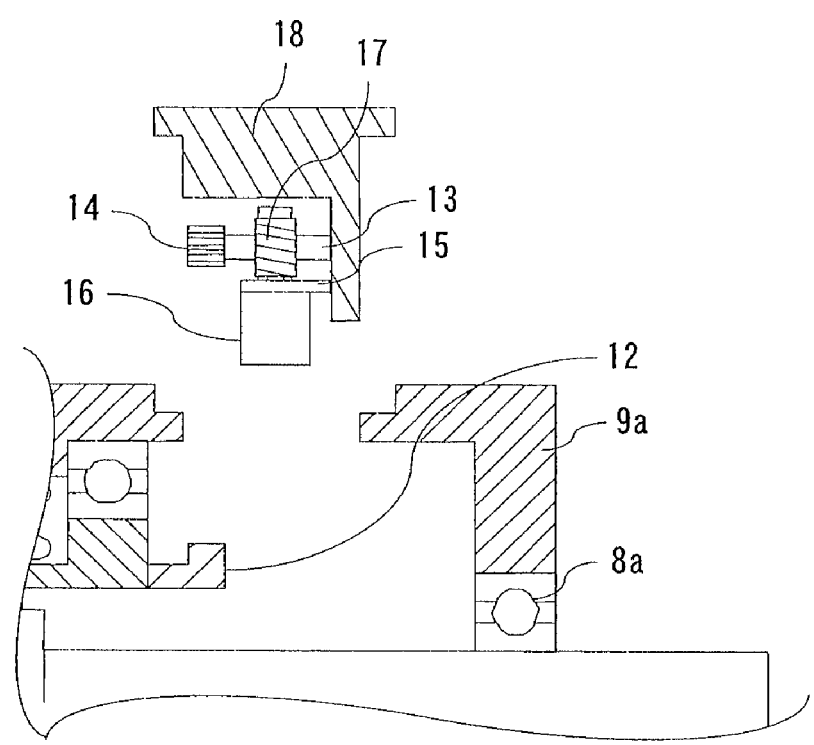
FIG. 3 is a sectional view showing details of a moving stator drive according to the first embodiment of the invention.

This first embodiment is characterized in that, as shown in FIG. 3, the gear shaft 13, the spur gear 14, the worm gear 17, the motor support plate 15, and the drive motor 16 are mounted on the gear box 18 removable with respect to the hosing 9. The gear box 18 is fixed by, for example, screws with respect to the housing 9. That is, it is characterized in that a moving stator drive formed of the gear shaft 13, the spur gear 14, the worm gear 17, the motor support plate 15, the drive motor 16, and the gear box 18 is disoposed detachably with respect to the housing 9.

Owing to such structure, only the gear box 18 can be easily removed, and grease-up with respect to gears and the like that are attached to the gear box 18 and the support cylinder 10 can be easily made, or replacement of parts can be easily made resulting in dramatically increased maintainability, thus enabling to achieve improvement in reliability of the devices.

In addition, the above-mentioned moving stator drive is constructed of the gear located at the moving stator 2, the gear engaging with this gear, and a motor driving this gear, so that it is possible to make positioning in a rotational direction of the moving stator 2 with accuracy in simple mechanism.

Furthermore, the gears and the motor of the above-mentioned moving stator drive are located in the housing 9, so that the devices can be mounted to be compact, and thus mounting space cannot be tight. In addition, a moving stator drive mechanism is protected in the housing, so that high reliability of the devices can be achieved.

On the other hand, coil leader lines 19 from the moving stator 2 are stored in the housing 9 (stored in non-tight space). Specifically, the coil leader lines 19 are wound loosely in a helical fashion with respect to a guide ring 20 attached to the support cylinder 10. In this case, the total arc of contact of the coil leader lines 19 is preferably not less than $\{360°+(360°/\text{the number of poles of the rotor } \mathbf{5})\}$. That is, in the case of 8 poles of the rotor 5, the total. arc of contact of the coil leader lines 19 is preferred to be not less than 405°. In other words, the coil leader lines 19 are preferably stored to be a length of not less than $\{(1+1/\text{the number of poles of the rotor}) \times \text{outer circumferential length of the moving stator}\}$. In addition, the coil leader lines 19 are fixed with a mold of silicon rubber 27 to the outlet of the housing 9.

Owing to such construction, there are no risk that the coil leader lines 19 are sharply folded, or any excess tension is exerted, and that the coil leader lines 19 are involved in the rotor 5 or the moving stator 2 to the extent of breaking or disconnection, thereby enabling to improve reliability.

In addition, the coil leader lines 19 are wound loosely along the guide ring 20, and thus the loose portions of the coil leader lines 19 are wound around the guide ring 20 or the coil leader lines 19 are loosened accompanied by the rotation of the moving stator 2, thereby enabling to prevent extra tension from exerting on the coil leader lines 19. Furthermore, it is possible to prevent the coil leader lines 19 from being involved in the rotor 6, thus enabling to improve reliability.

Embodiment 2

In the foregoing first embodiment, an electric rotating machine in which a fixed stator 1 and a moving stator 2 are located concentrically is described. Now, in a second embodiment according to the invention, another electric rotating machine in which a fixed stator 1 and a moving stator 2 are located axially in parallel is described.

Figure 4:
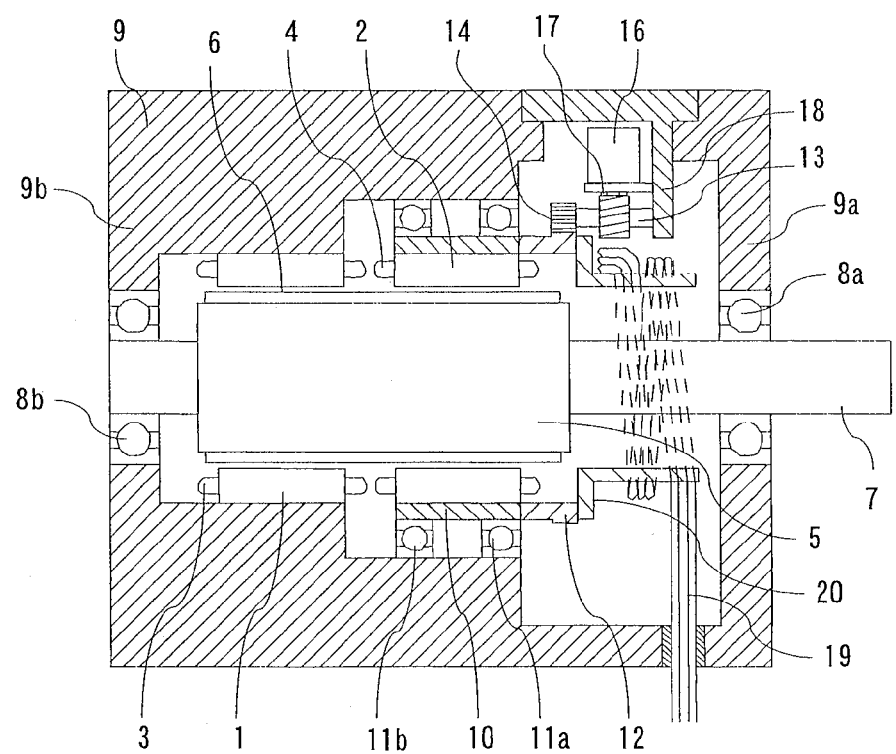
FIG. 4 is a longitudinal sectional view showing an electric rotating machine according to a second embodiment of the invention.

FIG. 4 is a sectional view showing the electric rotating machine according to the second embodiment of the invention. As shown in the drawing, in the electric rotating machine according to the present second embodiment, the fixed stator 1 and the moving stator 2 are located axially in parallel on the inner circumference of a cylindrical housing 9. Further, a rotor 5 is disposed concentrically via a predetermined gap on the inner circumferential side of those fixed stator 1 and moving stator 2.

A stator winding 3 is wound around the fixed stator 1, and a stator winding 4 is wound around the moving stator 2. Permanent magnets 6 are attached to the rotor 5 at a predetermined pitch circumferentially on the outer circumference thereof, and a shaft 7 for rotary output is attached to the central portion thereof. Furthermore, both ends of the shaft 7 are supported rotatably with bearings 8a and 8b that are attached to bearing supports 9a and 9b of the housing 9.

The moving stator 2 is fixed to the inner circumference of a support cylinder 10 made of non-magnetic and non-conductive materials. This support cylinder 10 is rotatably attached to the housing 9 via bearings 11a and 11b. Therefore, the moving stator 2 is constructed to be capable of relatively rotating with respect to the fixed stator 1. Furthermore, a spur gear 12 having a predetermined mechanical angle range is attached to the support cylinder 10. It is constructed such that this spur gear 12 is engaged with a spur gear 14 that is attached to a gear shaft 13, and further that a gear that is mounted on the gear shaft 13 is engaged with a worm gear 17 of a drive motor 16. The drive motor 16 is fixed to a motor support plate 15 of a gear box 18.

In the above-mentioned construction, when the drive motor 16 is driven, and thus the spur gear 12 is made to rotate by a predetermined mechanical angle via the worm gear 17, the gear shaft 13 and the spur gear 14, the moving stator 2 is rotated only by a predetermined angle along with the support cylinder 10. Thus, circumferentially electrical phases of the fixed stator 1 and the moving stator 2 are relatively changed, thereby enabling to make a combined voltage thereof variable.

This second embodiment is characterized in that, in the same manner as in the foregoing first embodiment, the gear shaft 13, the spur gear 14, the worm gear 17, the motor support plate 15, and the drive motor 16 are mounted on the gear box 18 removable with respect to a hosing 9. The gear box 18 is fixed with, for example, screws with respect to the housing 9. That is, it is characterized in that a moving stator drive formed of the gear shaft 13, the spur gear 14, the worm gear 17, the motor support plate 15, the drive motor 16, and the gear box 18 is disposed detachably with respect to the housing 9.

Owing to such structure, only the gear box 18 can be easily removed, and greasing with respect to gears and the like that are attached to the gear box 18 and the support cylinder 10 can be easily made, or replacement of parts can be easily made resulting in dramatically increased maintainability, thus enabling to achieve improvement in reliability of the devices.

In addition, the above-mentioned moving stator drive is constructed of a gear provided at the moving stator 2, a gear engaged with this gear, and a motor driving this gear, so that it is possible to make positioning in a rotational direction of the moving stator 2 with accuracy in simple mechanism.

Furthermore, the gears and the motor are disposed in the housing 9, so that the devices can be mounted to be compact, and thus mounting space cannot be tight. In addition, a moving stator drive mechanism is protected in the housing, so that high reliability of the device can be achieved.

On the other hand, coil leader lines 19 from the moving stator 2 are stored in the housing 9 (stored in non-tight space). Specifically, the coil leader lines 19 are wound loosely in a helical fashion with respect to a guide ring 20 attached to the support cylinder 10. In this case, the total arc of contact of the coil leader lines 19 is preferably not less than {360°+(360°/the number of poles of the rotor 5)}. That is, in the case of 8 poles of the rotor 5, the total arc of contact of the coil leader lines 19 is preferred to be not less than 405°. In other words, the coil leader lines 19 are preferably stored to be a length of not less than {(1+1/the number of poles of the rotor)×outer circumferential length of the moving stator}. In addition, the coil leader lines 19 are fixed with a mold of silicon rubber 27 to the outlet of the housing 9.

Owing to such construction, there are no risk that the coil leader lines 19 are sharply folded, or any excess tension is exerted, and that the coil leader lines 19 are involved in the rotor 5 or the moving stator 2 to the extent of breaking or disconnection, thereby enabling to improve reliability.

In addition, the coil leader lines 19 are wound loosely along the guide ring 20, and thus the loose portions of the coil leader lines 19 are wound around the guide ring 20 or the coil leader lines 19 are loosened accompanied by the rotation of the moving stator 2, thereby enabling to prevent extra tension from exerting on the coil leader lines 19. Furthermore, it is possible to prevent the coil leader lines 19 from being involved in the rotor 6, thus enabling to improve reliability.

Embodiment 3

Figure 5:
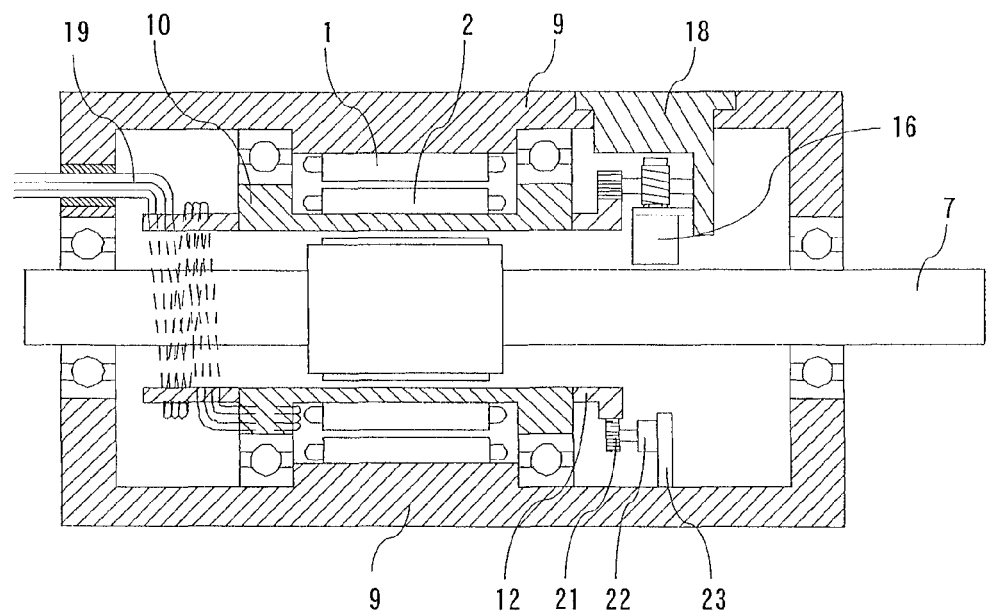
FIG. 5 is a longitudinal sectional view showing an electric rotating machine according to a third embodiment of the invention.

FIG. 5 is a longitudinally sectional view showing an electric rotating machine according to a third embodiment of the invention. In this third embodiment, a rotation angle sensor 22, to which such a spur gear 21 is attached so as to engage with a spur gear 12 that is attached to a support cylinder 10, is attached to a housing 9 via a sensor mounting plate 23. Further, other parts of the construction are the same as in the construction of an electric rotating machine according to the foregoing first embodiment.

In this third embodiment employing the above-mentioned structure, an advantage exists in that it is possible to prevent disconnection of the coil leader lines 19 or machine breakage due to that the moving stator 2 is rotated exceeding a predetermined rotation range. In addition, it is possible to detect a relative position in a rotation direction of the fixed stator 1 and the moving stator 2, thus enabling the optimum control depending on the number of revolutions of the rotor 5.

Embodiment 4

Figure 6:
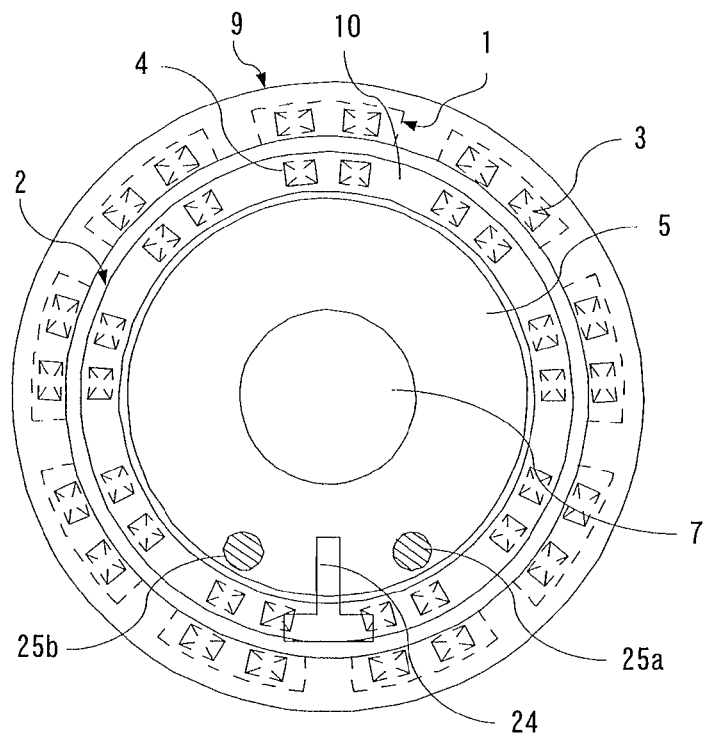
FIG. 6 is a cross sectional view showing an electric rotating machine according to a fourth embodiment of the invention.
Figure 7:
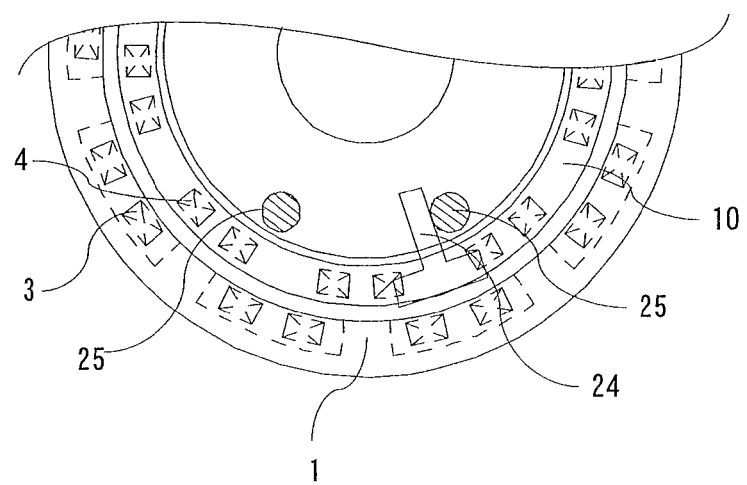
FIG. 7 is a partially cross sectional view explaining operations of the electric rotating machine according to the fourth embodiment of the invention.

FIG. 6 is a cross sectional view showing an electric rotating machine according to a fourth embodiment of the invention. As shown in FIG. 6, a moving-side stopper 24 is provided at a support cylinder 10 supported rotatably with respect to a housing 9. On the other hand, fixed-side stoppers 25a and 25b are attached axially from the housing 9. The rotation of the support cylinder 10 is restricted within the range between the fixed-side stoppers 25a and 25b. Even if the support cylinder 10 onto which the moving stator 2 is mounted is about to rotate and move out of the above-mentioned range, as shown in FIG. 7, the moving-side stopper 24 and the fixed-side stoppers 25 are brought in contact, and thus further rotation is prevented.

In this fourth embodiment as described above, even in the case where the moving stator 2 is about to rotate exceeding a predetermined value by malfunction of the drive motor 16 acting to drive and rotate the moving stator 2, due to that the moving-side stopper 24 and the fixed-side stoppers 25 are brought in contact, coil leader lines 19 are not rotated and moved out of the predetermined range of movement. Thus, it is possible to prevent the coil leader lines 19 from being disconnected.

Embodiment 5

Figure 8:
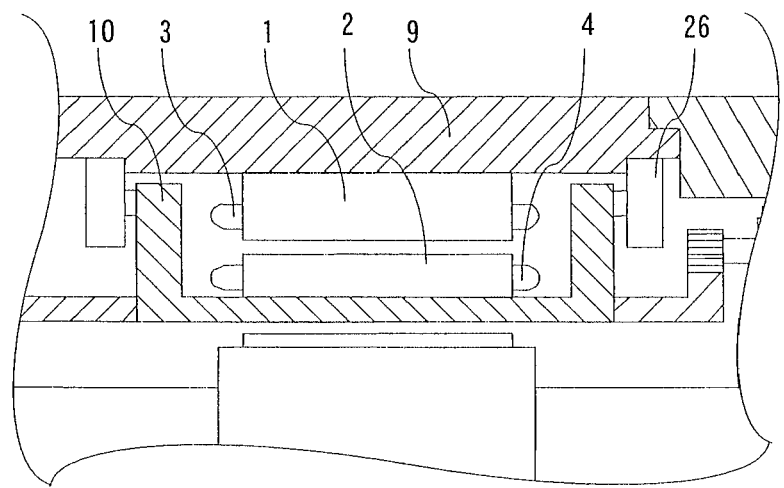
FIG. 8 is a partially longitudinal section showing an electric rotating machine according to a fifth embodiment of the invention.
Figure 9:
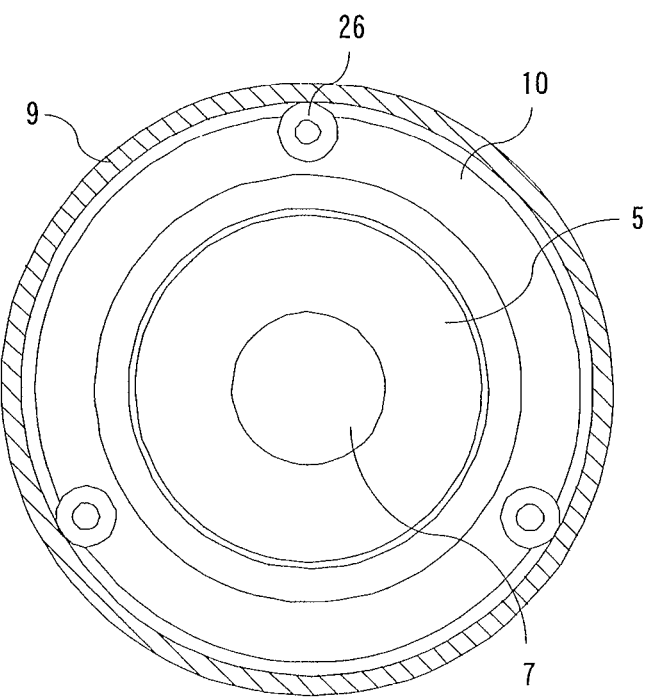
FIG. 9 is a cross sectional view showing the electric rotating machine according to the fifth embodiment of the invention.

FIG. 8 is a partially longitudinally sectional view showing an electric rotating machine according to a fifth embodiment of the invention, and FIG. 9 is a cross sectional view showing the electric rotating machine according to the fifth embodiment of the invention. In the foregoing first embodiment, the moving stator 2 is attached to the support cylinder 10, and the support cylinder 10 is rotatably supported with the bearings 11a and 11b with respect to the housing 9.

On the other hand, this fifth embodiment is constructed such that a plurality of rollers 26 are disposed circumferentially at the support cylinder 10 as shown in FIG. 9 instead of the bearings 11a and 11b, and the support cylinder 10 is supported with respect to the housing 9 via the mentioned rollers 26.

In this present fifth embodiment, lower costs can be achieved by using the rollers 26 instead of the bearings 11a and 11b of larger diameters.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An electric rotating machine comprising: a housing having an opening; a support member provided in the opening of the housing; a fixed stator fixed to the inner circumferential side of said housing; a moving stator supported rotatably on the inner circumferential side of said housing; a rotor disposed concentrically on the inner circumferential side of said fixed stator and said moving stator; and a moving stator drive mounted on an inner surface of the support member and causing said moving stator to rotate by a predetermined angle, the moving stator drive and the support member together forming a moving stator drive unit;
wherein said moving stator drive is provided inside the housing when the support member is provided in the opening and the moving stator drive unit is detachable from the opening of said housing from outside the housing.

2. The electric rotating machine according to claim 1, wherein a coil leader line of said moving stator is stored in an internal part of said housing so that said moving stator is capable of rotating by said predetermined angle.

3. The electric rotating machine according to claim 1, wherein said moving stator is disposed concentrically on the inner circumferential side of said fixed stator.

4. The electric rotating machine according to claim 1, wherein said fixed stator and said moving stator are disposed axially in parallel.

5. The electric rotating machine according to claim 1, wherein said moving stator drive is constructed of a gear provided at said moving stator, a gear engaged with said gear, and a motor driving said gear.

6. The electric rotating machine according to claim 5, wherein said gear and said motor of said moving stator drive are disposed in said housing.

7. The electric rotating machine according to claim 2, wherein said coil leader line is stored to be a length of not less than {(1+1/the number of poles of the rotor)×outer circumferential length of the moving stator}.

8. The electric rotating machine according to claim 2, wherein a guide ring is disposed at the end of said moving stator, and said coil leader line is disposed in a helical fashion loosely with respect to said guide ring.

9. The electric rotating machine according to claim 1, wherein a rotation angle sensor is disposed so as to engage with a gear mounted at the end of said moving stator.

10. The electric rotating machine according to claim 1, wherein a stopper is disposed to regulate the range of rotation of said moving stator.

11. The electric rotating machine according to claim 1, wherein said moving stator is supported rotatably with respect to said housing via a roller.

12. The electric rotating machine according to claim 1, wherein the support member is flush with the outer surface of the housing when the moving stator drive unit is disposed in the opening of the housing.

13. The electric rotating machine according to claim 1, wherein the support member is substantially L-shaped and includes at least one flange configured to engage with the opening of the housing.

* * * * *